(12) United States Patent
Yeh (10) Patent No.: US 8,256,751 B2
(45) Date of Patent: Sep. 4, 2012

(54) MANIPULATOR

(75) Inventor: Chi-Hsien Yeh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 999 days.

(21) Appl. No.: 12/211,818

(22) Filed: Sep. 17, 2008

(65) Prior Publication Data

US 2009/0245993 A1 Oct. 1, 2009

(30) Foreign Application Priority Data

Mar. 25, 2008 (CN) .......................... 2008 1 0300702

(51) Int. Cl.
*B23Q 3/00* (2006.01)

(52) U.S. Cl. ............ 269/9; 269/47; 269/48.1; 269/48.2; 29/281.1

(58) Field of Classification Search ............... 29/281.1; 269/9, 27, 48, 48.1, 10, 37, 40, 41, 45, 49, 269/48.2, 309; 279/2.23; 82/160; 414/226.01, 414/806, 751.1; 403/326; G11B 15/68
See application file for complete search history.

(56) References Cited

U.S. PATENT DOCUMENTS

| | | | | |
|---|---|---|---|---|
| 456,891 A * | 7/1891 | Fish | | 269/45 |
| 2,908,300 A * | 10/1959 | Hahn | | 83/763 |
| 3,258,136 A * | 6/1966 | Rockstrom et al. | | 414/226.01 |
| 3,590,458 A * | 7/1971 | Day | | 29/281.4 |
| 4,015,456 A * | 4/1977 | Moberg | | 70/34 |
| 4,571,149 A * | 2/1986 | Soroka et al. | | 414/749.1 |
| 4,828,241 A * | 5/1989 | Yang | | 269/114 |
| 5,415,066 A * | 5/1995 | Erickson et al. | | 82/160 |
| 5,494,553 A * | 2/1996 | Colucci | | 156/580 |
| D410,804 S * | 6/1999 | Murray | | D6/455 |
| 6,416,273 B1 * | 7/2002 | Herbermann et al. | | 414/751.1 |
| 6,527,266 B1 * | 3/2003 | Yonezawa et al. | | 269/309 |
| 6,955,347 B2 * | 10/2005 | Kawakami et al. | | 269/309 |
| 7,048,267 B2 * | 5/2006 | Bries | | 269/41 |
| 7,168,693 B1 * | 1/2007 | Sjuts et al. | | 269/37 |
| 7,574,768 B2 * | 8/2009 | Morris et al. | | 15/145 |
| 7,819,392 B2 * | 10/2010 | Kuroda et al. | | 269/309 |
| 7,963,717 B2 * | 6/2011 | Seger | | 403/322.2 |
| 8,005,570 B2 * | 8/2011 | Gloden et al. | | 700/245 |
| 8,047,520 B2 * | 11/2011 | Kuroda | | 269/309 |
| 2001/0030391 A1 * | 10/2001 | Barbieux | | 269/48.1 |
| 2008/0061486 A1 * | 3/2008 | Kuroda et al. | | 269/48.1 |
| 2009/0226249 A1 * | 9/2009 | Yeh | | 403/326 |
| 2009/0245993 A1 * | 10/2009 | Yeh | | 414/751.1 |
| 2009/0261519 A1 * | 10/2009 | Piggott | | 269/9 |

(Continued)

FOREIGN PATENT DOCUMENTS

CN 1411952 A 4/2003

(Continued)

*Primary Examiner* — Lee D Wilson
*Assistant Examiner* — Jamal Daniel
(74) *Attorney, Agent, or Firm* — Altis Law Group, Inc.

(57) ABSTRACT

An exemplary manipulator includes a main body, a plurality of holding devices, and a supporting arm. The main body includes four connecting surfaces. The holding devices are connected to the connecting surfaces of the main body. The holding devices are configured to seize and release grasping members. Each of the grasping members defines four latching holes. The holding devices are capable of abutting inner surfaces of the latching holes. The supporting arm is fixed to the main body, and configured to rotate with the main body.

12 Claims, 10 Drawing Sheets

U.S. PATENT DOCUMENTS

| | | | |
|---|---|---|---|
| 2009/0278294 A1* | 11/2009 | Wang et al. | 269/9 |
| 2010/0068015 A1* | 3/2010 | Yeh et al. | 414/226.01 |
| 2010/0252978 A1* | 10/2010 | Philippe | 269/296 |
| 2011/0052349 A1* | 3/2011 | Sone et al. | 414/226.01 |
| 2011/0167969 A1* | 7/2011 | Erickson et al. | 82/160 |
| 2012/0005872 A1* | 1/2012 | Song | 29/235 |

FOREIGN PATENT DOCUMENTS

| | | |
|---|---|---|
| EP | 0180829 B1 | 7/1991 |
| EP | 0506489 A2 | 9/1992 |
| TW | 369996 | 9/1999 |
| TW | 493483 | 7/2002 |

\* cited by examiner

MANIPULATOR

BACKGROUND

1. Technical Field

The present disclosure relates to manipulators and, more particularly to a manipulator used to seize and release grasping members.

2. Discussion of Related Art

Robots are widely used in automatic production devices. A manipulator is an important component of a robot which may be used to seize a workpiece, such as a housing of an electronic device, to transport to a selected destination. Manipulators often include a mechanical hand capable of clamp-holding a workpiece. The manipulators can move the workpiece from one place to other designated places by rotatory movement of the mechanical hand. However, the manipulators often have a complex structure and occupy a large amount of volume. In addition, the manipulators generally only seize one workpiece at a time and service a single machine. When the workpiece is processed by the machine, the manipulator takes away the workpiece, and then seizes an another workpiece to attach to the machine. Thus, the standby time of the machine is too long, resulting in low production efficiency.

Therefore, a manipulator which has a simpler structure and leads to a higher production efficiency is desired.

SUMMARY

A manipulator includes a main body, a plurality of holding devices, and a supporting arm. The main body includes four connecting surfaces. The holding devices are connected to the connecting surfaces of the main body. The holding devices are configured to seize and release grasping members. Each of the grasping members defines four latching holes. The holding devices are capable of abutting inner surfaces of the latching holes. The supporting arm is fixed to the main body, and configured to rotate with the main body.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present manipulator. Moreover, in the drawings, like reference numerals designate corresponding parts throughout the several views.

DETAILED DESCRIPTION

Figure 1:
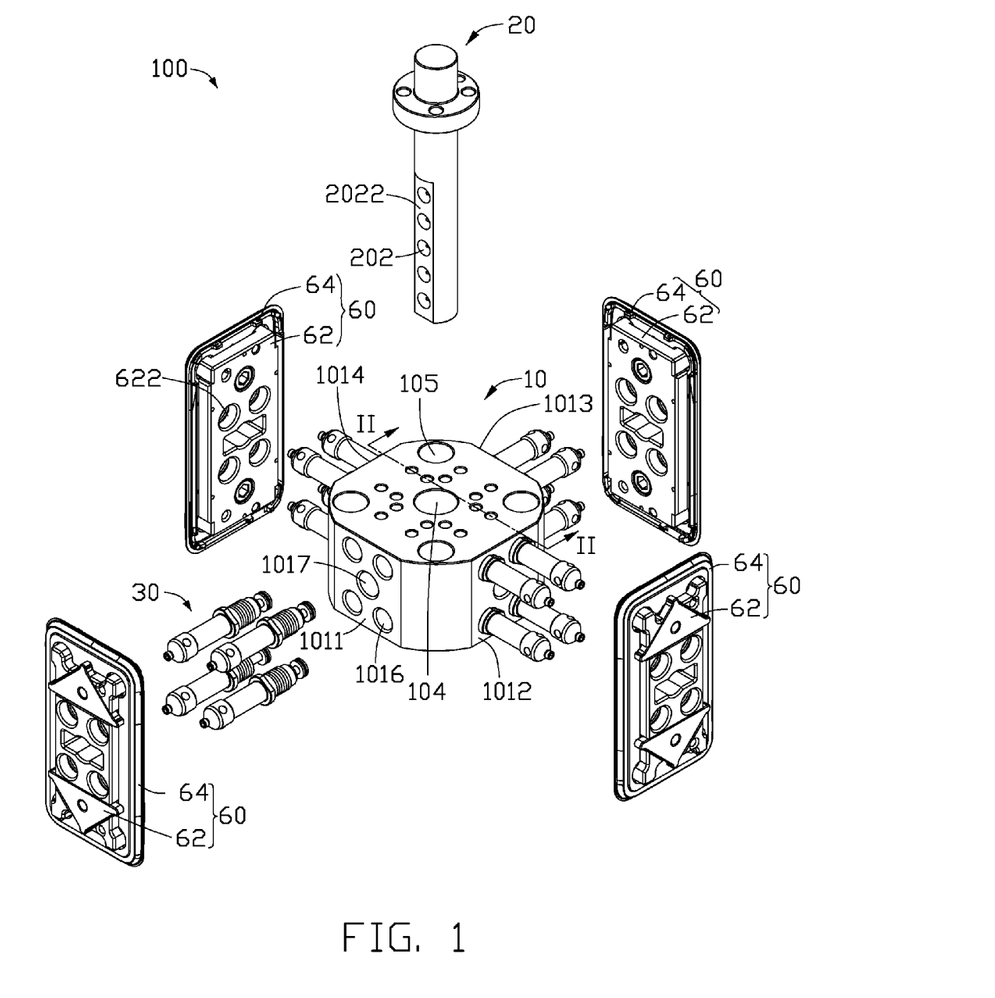
FIG. 1 is a partially exploded, isometric view of a manipulator in accordance with one embodiment of the present disclosure, and showing four grasping members that need to be seized by the manipulator.

Referring to FIG. 1, a manipulator 100 in accordance with one embodiment of the present disclosure is shown. The manipulator 100 includes a main body 10, a supporting arm 20, and a plurality of holding devices 30. Each of the plurality of the holding devices 30 are configured to seize and release the grasping members 60. Each of the grasping members 60 includes a clamp member 62 and a workpiece 64. The clamp member 62 defines a plurality of latching holes 622, and is configured for clamp-holding the workpiece 64. The workpiece 64 is a housing used in a personal digital assistant (PDA).

Figure 2:
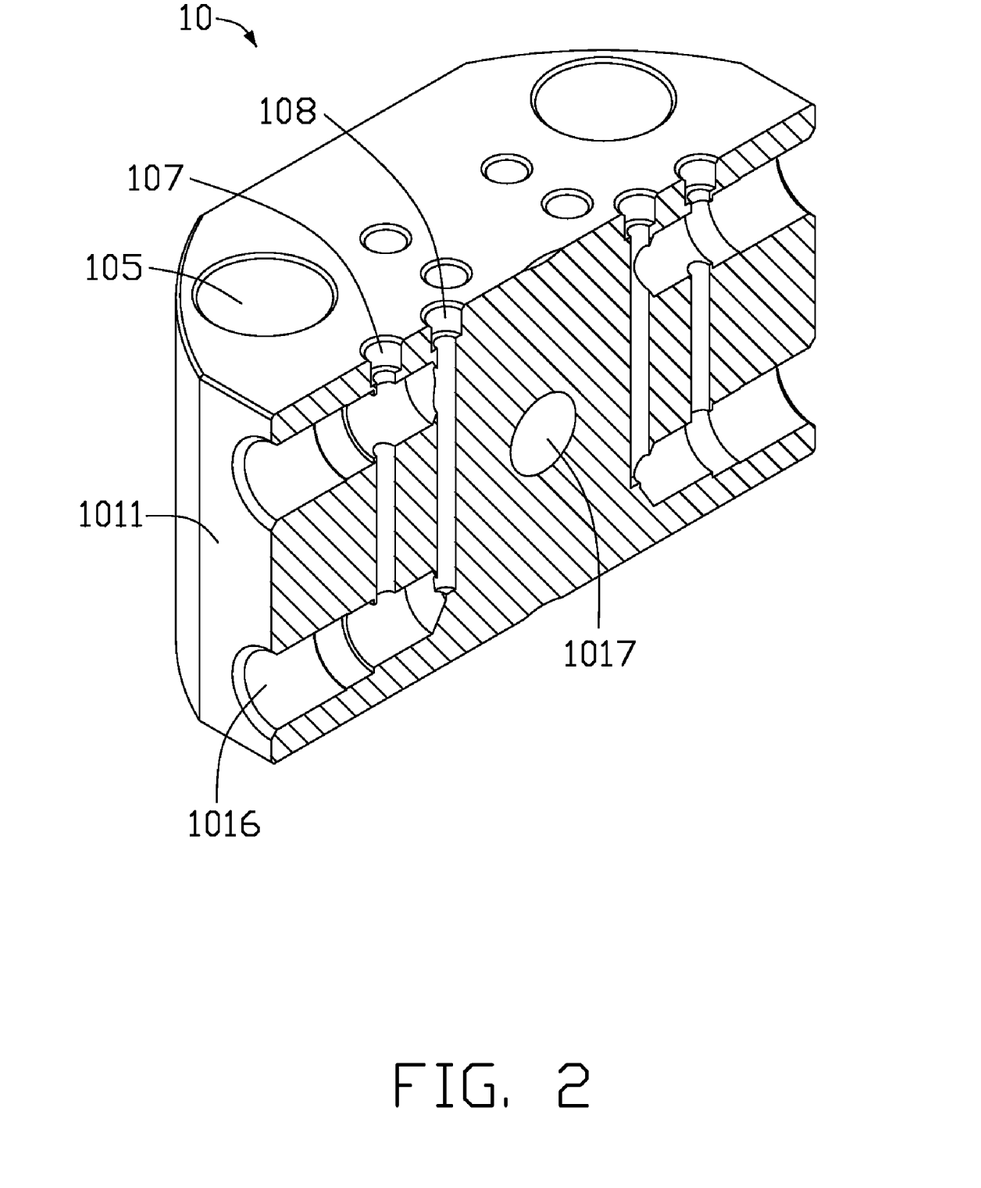
FIG. 2 is a cross-sectional, isometric view of a main body of the manipulator in FIG. 1, taken along the line II-II of FIG. 1.

Referring also to FIG. 2, the main body 10 is shaped substantially as a cuboid. The main body 10 defines a holding hole 104 in a middle portion of a top surface of the main body 10, four through holes 105 in four corner portions of the top surface of the main body 10, a plurality of first gas ducts 107, and a plurality of second gas ducts 108, wherein each of the plurality of the first and second gas ducts 107, 108 extend through at least a section of the main body 10 and the top surface of the main body 10. The main body 10 includes four connecting surfaces 1011, 1012, 1013, 1014. The connecting surfaces 1011, 1012, 1013, 1014 are four side surfaces of the main body 10. A plurality of assembling holes 1016 corresponding to the holding devices 30 and a mounting hole 1017 are defined in each of the connecting surfaces 1011, 1012, 1013, 1014. The through holes 105 are configured to decrease a weight of the main body 10. The first and the second gas ducts 107, 108 perpendicularly communicate with the assembling holes 1016.

The supporting arm 20 is substantially cylindrically shaped, and includes two flat surfaces 2022 opposite to each other and defines a plurality of conical grooves 202 in each of the flat surfaces 2022. The supporting arm 20 is fixed to the main body 10 via the conical grooves 202.

Figure 3:
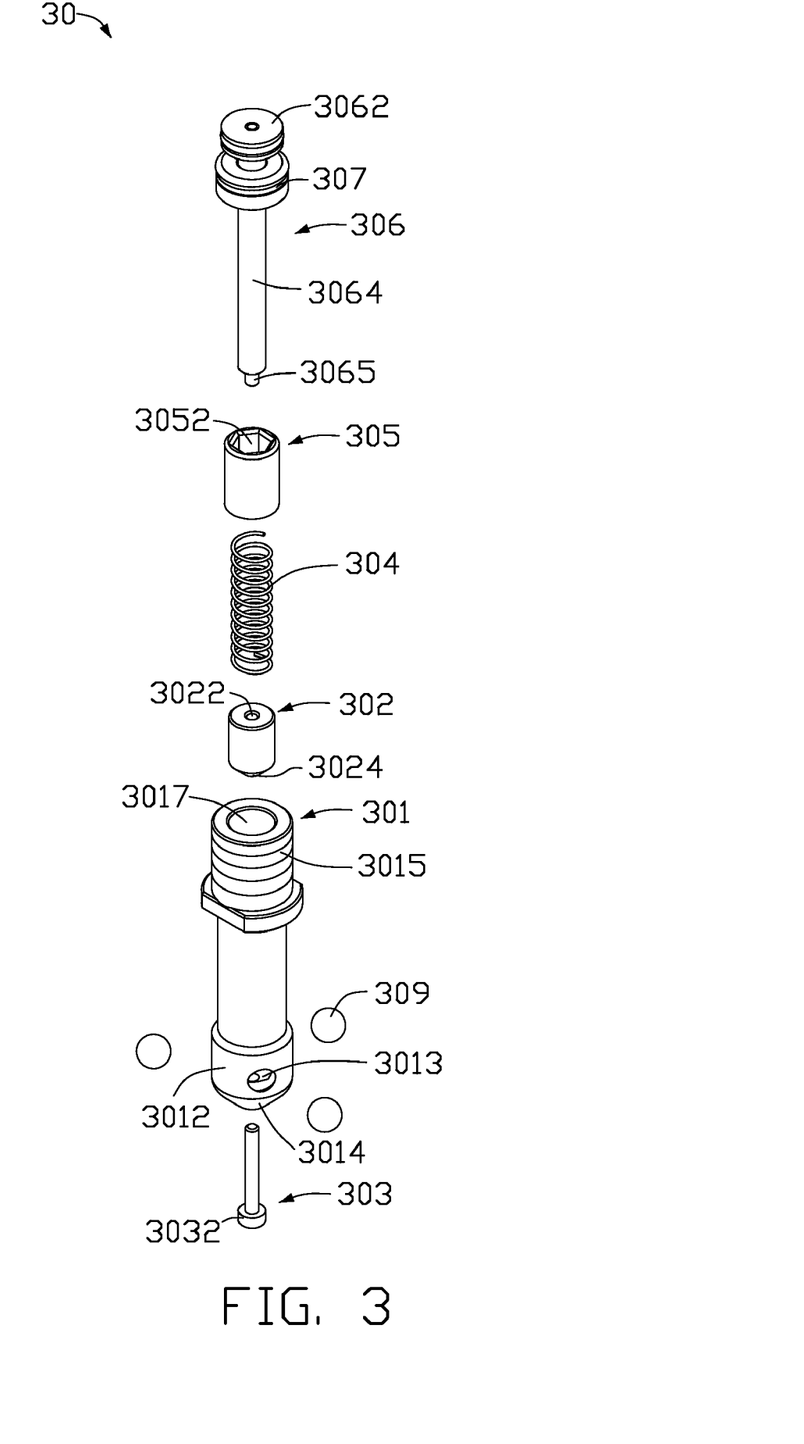
FIG. 3 is an exploded, isometric view of a holding device of the manipulator in FIG. 1.

Referring to FIG. 3, each of the holding devices 30 includes a holding member 301, a thimble 302, a fixing member 303, a spring 304, a brake member 305, a cylinder shaft 306, a seal cover 307, and three latching members 309.

The holding member 301 is substantially cylindrical. The holding member 301 forms a holding portion 3012 at a first end of the holding member 301, a conical portion 3014 extending from the bottom of the holding portion 3012, and a threaded portion 3015 at a second end opposite to the holding portion 3012. The threaded portion 3015 is configured to engage in the assembling holes 1016 of the main body 10, so that the holding member 301 is connected to the main body 10.

The holding portion 3012 is shaped as a cylinder, and further defines a receiving chamber (not labeled). The holding portion 3012 is configured to be inserted into one of latching holes 622 of the grasping members 60.

The holding member 301 defines three receiving holes 3013 in the holding portion 3012 and a through hole 3017. The receiving holes 3013 are evenly arranged in a sidewall of the holding portion 3012 and communicate with the receiving chamber, and are configured to receive the latching members 309. The through hole 3017 extends along a cylindrical axis of the holding member 301 and communicates with the receiving chamber of the holding portion 3012. A portion of the through hole 3017 extending through the conical portion 3014 has a diameter smaller than the diameter of the other portion of the through hole 3017. In the illustrated embodiment, the latching members 309 are balls. A diameter of each receiving hole 3013 is smaller than the diameter of the each latching member 309, thereby preventing the latching members 309 from sliding out of the receiving holes 3013.

The thimble 302 defines a fixing hole 3022, and includes a resisting portion 3024 formed on a bottom thereof. The fixing hole 3022 is a threaded hole. The resisting portion 3024 is frustum-shaped. The resisting portion 3024 is configured to abut the latching members 309, and can press the latching members 309 to partially protrude out of the receiving holes 3013 of the holding member 301.

The fixing member 303 is a bolt including a head portion 3032 and a threaded portion (not labeled). The threaded portion is configured to engage in the fixing hole 3022 of the thimble 302.

The spring 304 is a helical compression spring. The brake member 305 is substantially a hollow cylinder, and defines a central hole 3052. The brake member 305 is configured to tightly engage in the through hole 3017.

The cylinder shaft 306 includes a piston portion 3062 and a shaft portion 3064, and a tip portion 3065 extends from a bottom of the shaft portion 3064. The diameter of the tip portion 3065 is smaller than that of the shaft portion 3064. The shaft portion 3064 of the cylinder shaft 306 is received in the through hole 3017 of the holding member 301, and the tip portion 3065 is fixed in the fixing hole 3022 of the thimble 302.

Figure 4:
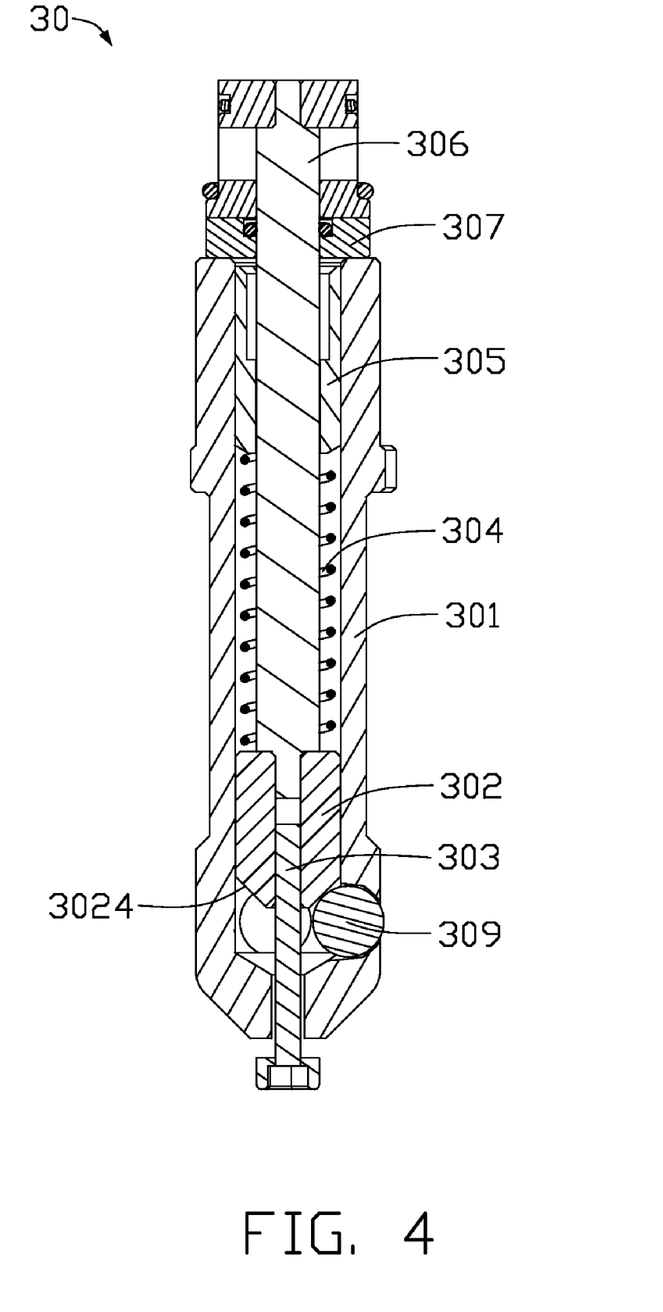
FIG. 4 is a cross-sectional, isometric view of the holding device of the manipulator in FIG. 3.
Figure 5:
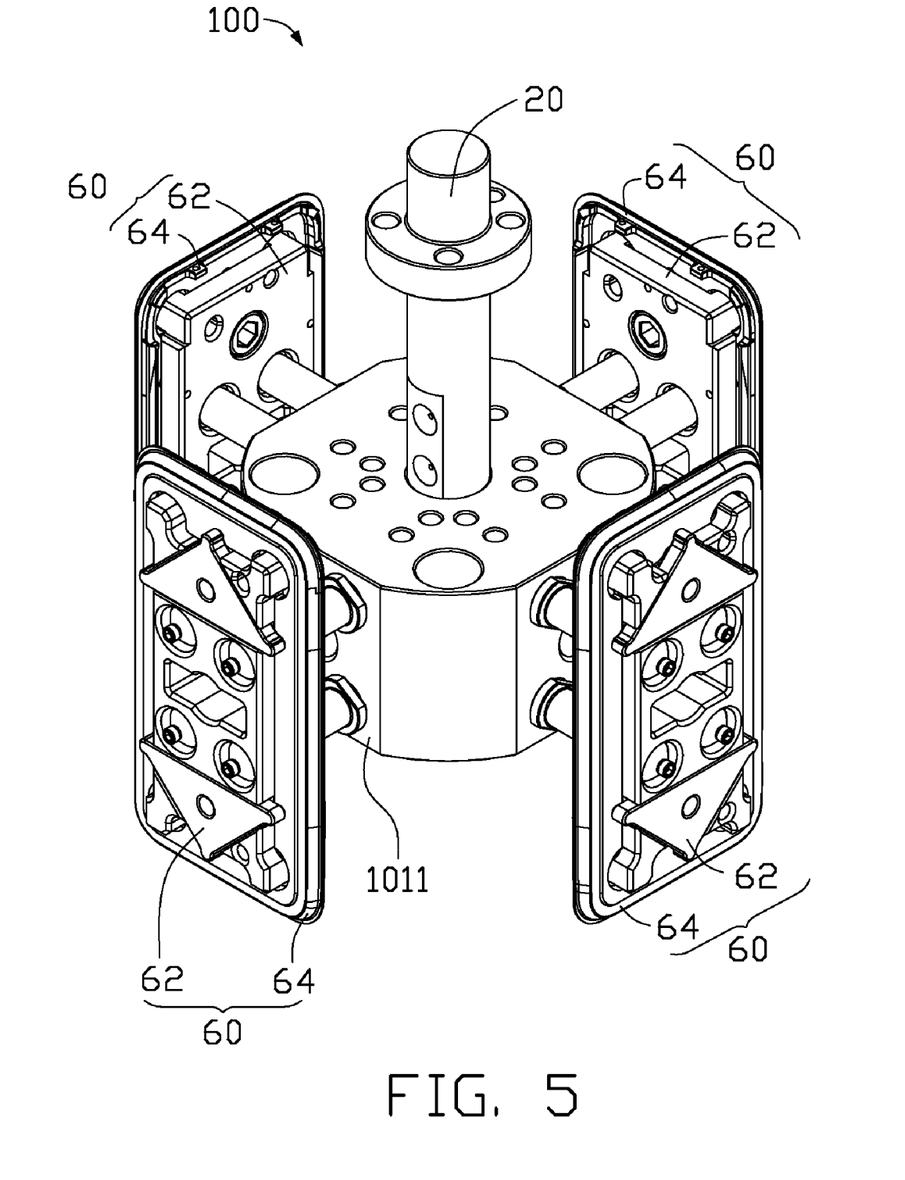
FIG. 5 is an assembled, isometric view of the manipulator in FIG. 1, and showing the grasping members seized by the manipulator.

Referring to FIG. 4, in assembly, the latching members 309 are placed in the receiving chamber of the holding portion 3012 via the through hole 3017, and the latching members 309 partially engages in the three receiving holes 3013 of the holding member 301 correspondingly. Then, the thimble 302 is received in the through hole 3017 of the holding member 301, and the resisting member 3024 of the thimble 302 resists the latching members 309. The latching members 309 partially protrude out of the receiving holes 3013 of the holding member 301. After that, the spring 304 and the brake member 305 are received in the through hole 3017 of the holding member 301. The spring 304 is compressed. Two ends of the spring 304 abut the thimble 302 and the brake member 305 respectively. The brake member 305 is fixed to an inner surface of the holding member 301. The shaft portion 3064 of the cylinder shaft 306 is passed through the center hole 3052 of the brake member 305 and the spring 304. The tip portion 3065 is fixed in the fixing hole 3022 of the thimble 302. At last, the fixing member 303 is inserted into the through hole 3017 from the bottom of the holding member 301, and is fixed in the fixing hole 3022 of the thimble 302.

Referring also to FIGS. 2 and 3, the threaded portions 3015 of the holding devices 30 engage in the assembling holes 1016 of the main body 10. Each of the piston portions 3062 and the seal cover 307 of the holding devices 30 are disposed between the first gas ducts 107 and the second gas ducts 108, thereby preventing gas from freely flowing between the first gas ducts 107 and the second gas ducts 108. The supporting arm 20 is inserted into the holding hole 104 of the main body 10. The supporting arm 20 is fixed to the main body 10 via the conical grooves 202 of the supporting arm 20, the mounting holes 1017 of the main body 10, and fixing members (not shown). The supporting arm 20 is rotatable with the main body 10.

When the manipulator 100 seizes the grasping members 60, the holding portions 3012 of the holding members 301 aim at the latching holes 622 of the clamp members 62. At this time, the thimble 302 abuts the latching members 309, and the latching members 309 partially protrude out of the holding members 301. Gas is injected into the first gas ducts 107, or gas in the second gas ducts 108 is pumped out. Thus, an air pressure in the first gas ducts 107 is larger than an air pressure in the second gas ducts 108, thereby pushing the piston portions 3062 and the shaft portion 3064 to move towards the second gas ducts 108. The thimble 302 moves towards the second gas ducts 108, with the spring 304 being compressed further. Then, the holding members 301 are gradually inserted into the latching holes 622 of the grasping members 60. The inner surfaces of the latching holes 622 abut the latching members 309 and press the latching members 309 into the receiving holes 3013 of the holding member 301. The holding portions 3012 of the holding members 301 are completely inserted into the latching holes 622 of the grasping members 60.

Then, gas is stopped from being injected into the first gas ducts 107, and gas is pumped out of the first gas ducts 107, or gas is injected into the second gas ducts 108. An air pressure in the second gas ducts 108 is higher than an air pressure in the first gas ducts 107, thereby pushing the piston portions 3062 and the shaft portion 3064 to move towards the first gas ducts 107. The thimble 302 moves towards the latching members 309. The spring 304 is capable of exerting a rebound force on the thimble 302. The thimble 302 presses the latching members 309 to partially protrude out of the holding member 301. The latching members 309 abut the inner surfaces of the latching holes 622 of the grasping members 60. Thus, the grasping members 60 are automatically seized by the holding device 30 of the manipulator 100.

When the manipulator 100 releases the grasping members 60, gas is injected into the first gas ducts 107, or gas in the second gas ducts 108 is pumped out. The shaft portion 3064 and the thimble 302 move towards the second gas ducts 108. The latching members 309 are recessed in the receiving holes 3013 of the holding member 301, and do not abut the inner surfaces of the latching holes 622 anymore. Thus, the grasping members 60 are automatically released from the holding device 30 of the manipulator 100.

The manipulator 100 is employed in a computerized numerical control (CNC) milling machine (not shown). A process of seizing and discharging the grasping members 60 and half-finished grasping members 60' by the manipulator 100 will be described now. The grasping members 60 become the half-finished grasping members 60' when the workpieces 64 are processed by the CNC milling machine.

Figure 6:
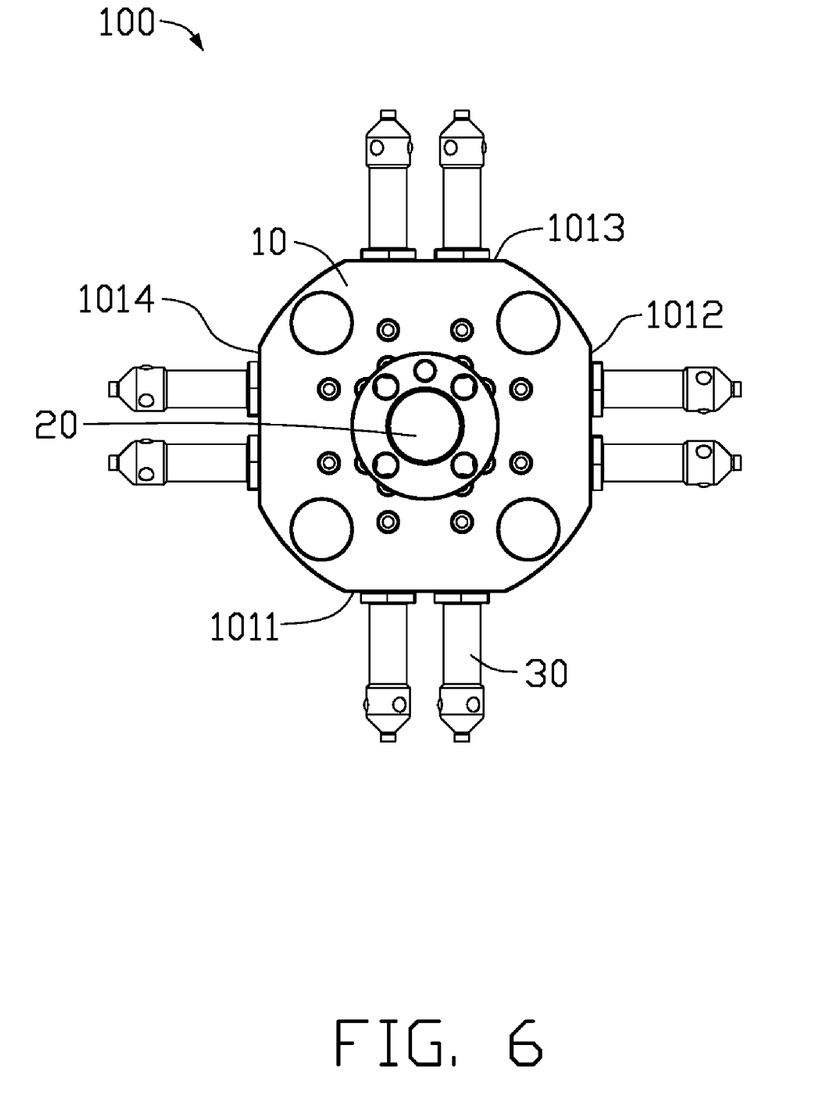
FIG. 6 illustrates a first step in the practice of seizing grasping members of the manipulator in FIG. 1.
Figure 7:
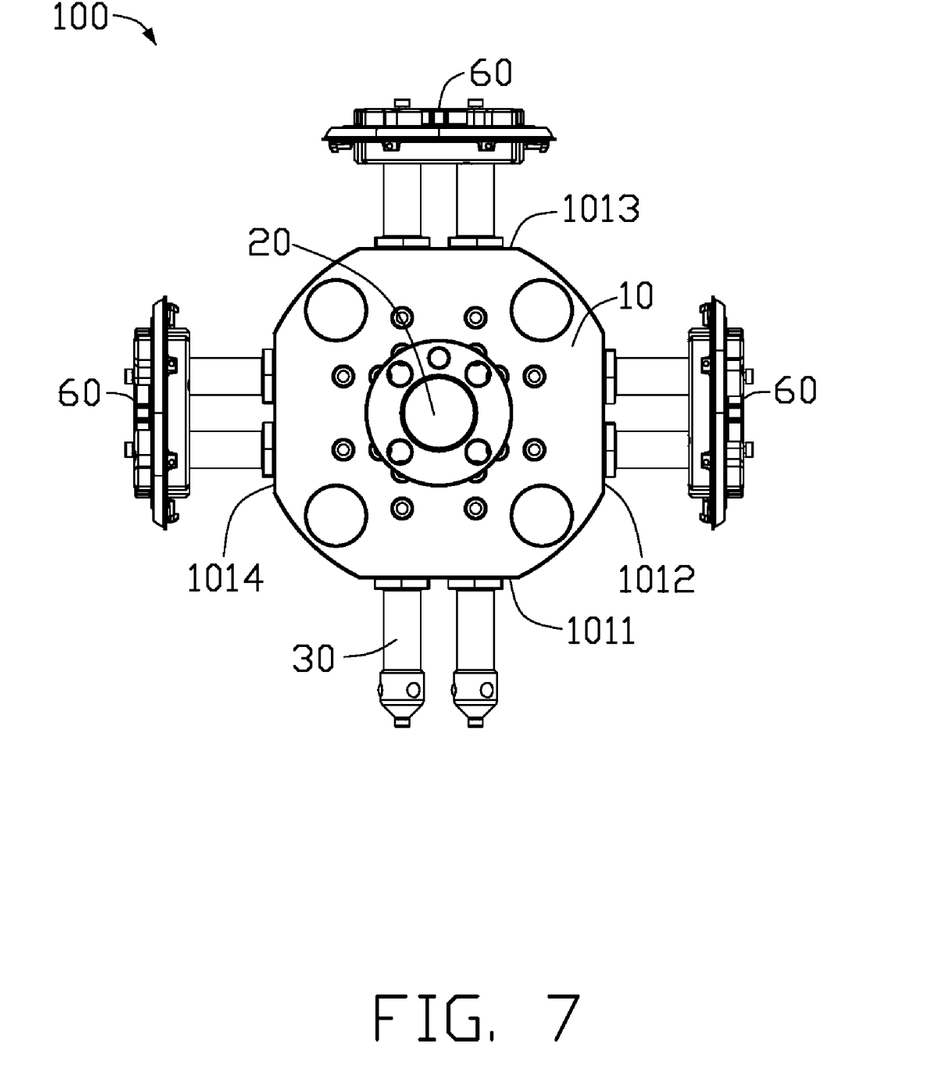
FIG. 7 illustrates a second step in the practice of seizing grasping members of the manipulator in FIG. 1.
Figure 8:
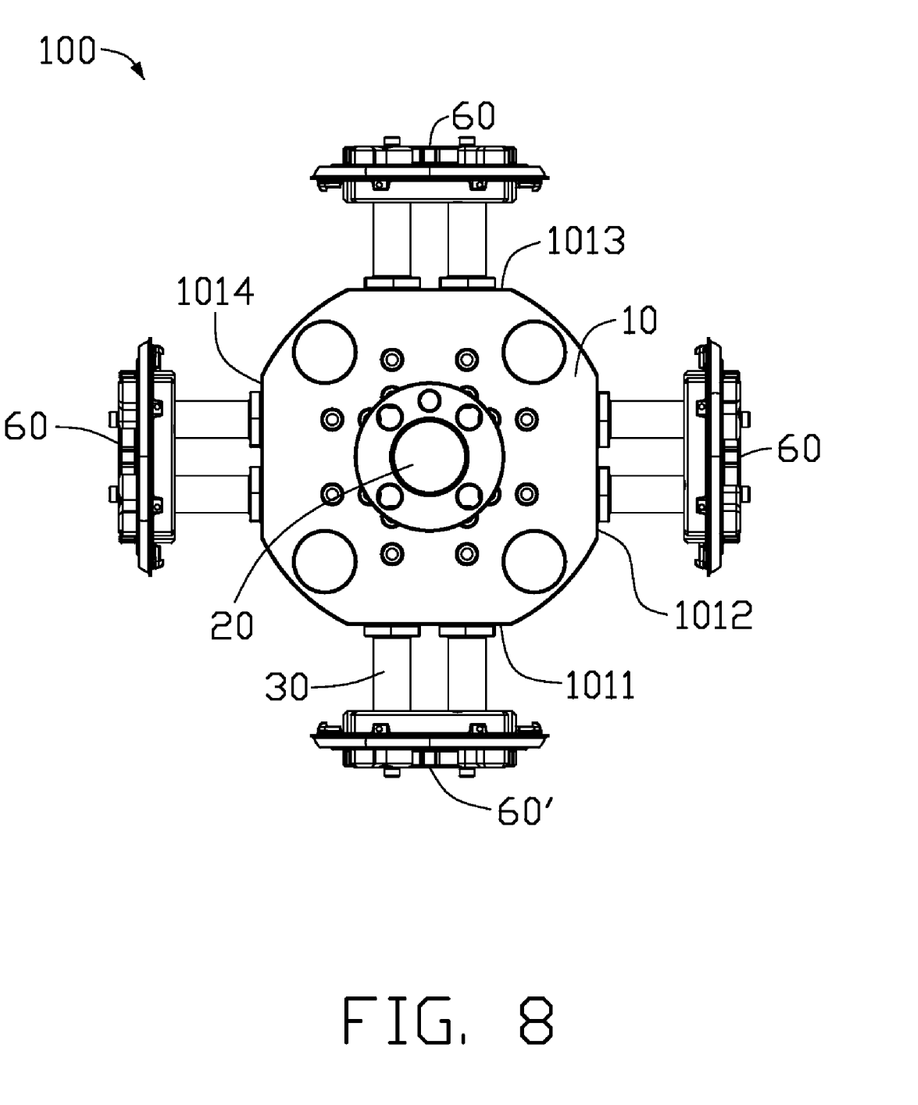
FIG. 8 illustrates a third step in the practice of seizing grasping members of the manipulator in FIG. 1.
Figure 9:
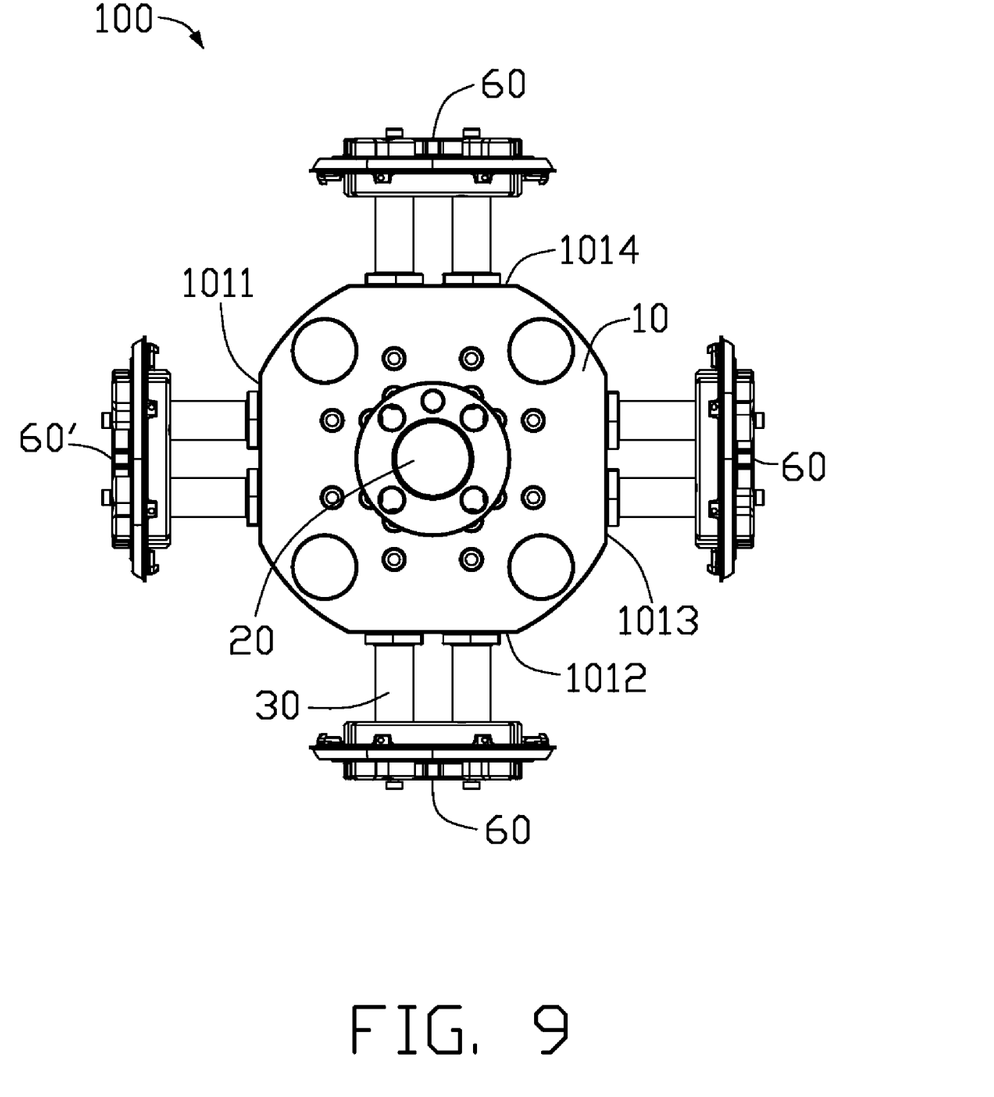
FIG. 9 illustrates a fourth step in the practice of seizing grasping members of the manipulator in FIG. 1.
Figure 10:
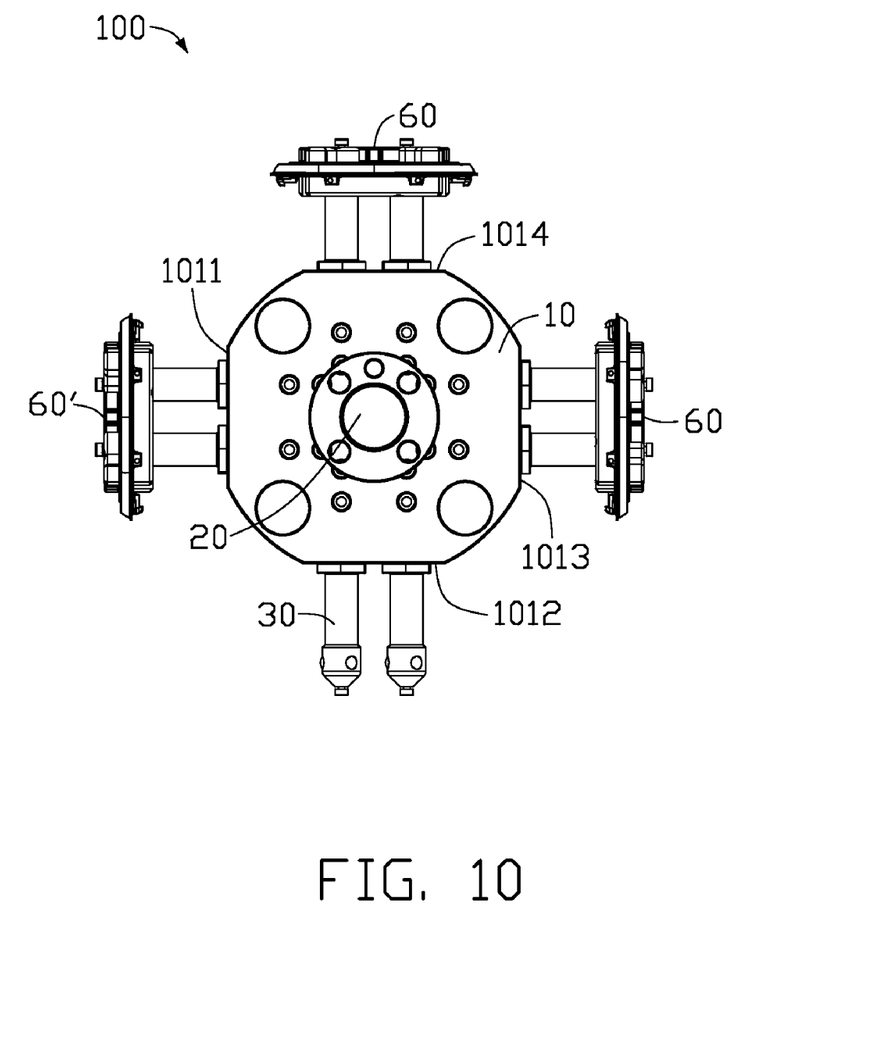
FIG. 10 illustrates a fifth step in the practice of seizing grasping members of the manipulator in FIG. 1.

Referring to FIG. 6, in a first step, the holding devices 30 of the manipulator 100 are in an idle state where they are waiting for commands. In this idle state, the holding devices 30 do not seize anything. Referring to FIG. 7, in a second step, the supporting arm 20 is driven to rotate, the manipulator 100 seizes the three grasping members 60, with the holding devices 30 disposed on the side surface 1011 seizing nothing. Referring to FIG. 8, in a third step, the holding devices 30 disposed on the side surface 1011 seize the half-finished grasping member 60' that is processed by a milling machine. Referring to FIG. 9, in a fourth step, the supporting arm 20 with the main body 10 of the manipulator 100 is rotated 90 degrees. After rotating the main body 10, the side surface 1012 is adjacent to a worktable (not shown) of the milling machine. Referring to FIG. 10, in a fifth step, the grasping member 60 disposed on the side surface 1012 is released from the manipulator 100 and attached to the worktable of the milling machine. When the grasping member 60 attached on the milling machine is processed by the milling machine and becomes the grasping member 60', repeating the third steps to the fifth steps in order again.

In this embodiment, the plurality of holding devices 30 are disposed on the connecting surfaces 1011, 1012, 1013, 1014 of the manipulator 100. The manipulator 100 can seize four grasping members 60 at a time, so that the manipulator 100 can change grasping members 60 for two or more than two machines in a short time. The standby time of the machines is short, resulting in a higher production efficiency. In addition, the structure of the manipulator 100 is very simple.

Alternatively, the main body 10 may include more than four connecting surfaces. At least one holding device 30 is connected to each connecting surface. The fixing members 303 of the holding devices 30 may be omitted. The spring 304 may be replaced by other elastic member, such as rubber washer. The latching members 309 may be other latching members that can protrude out of and recess into the holding member 301.

It should be understood that, the size and the structure of the holding devices 30 corresponds to the type of the grasping members 60.

It is believed that the present embodiments and their advantages will be understood from the foregoing description, and it will be apparent that various changes may be made thereto without departing from the spirit and scope of the present disclosure or sacrificing all of its material advantages, the examples hereinbefore described merely being preferred or exemplary embodiments of the present disclosure.

What is claimed is:

1. A manipulator, comprising:
a main body comprising at least two connecting surfaces;
a plurality of holding devices connected to each of the at least two connecting surfaces of the main body, the holding devices configured to seize and release grasping members, wherein the main body is substantially cubodial shaped, the main body defines a holding hole in a top surface thereof; each of the least two connecting surfaces of the main body defines a mounting hole, and each of the grasping members defines at least one latching hole, wherein the plurality of holding devices are capable of abutting an inner surface of the at least one latching hole; and
a supporting arm fixed to the main body, and configured to rotate with the main body; wherein the supporting arm is substantially rod-shaped, and defines at least one conical groove, the supporting arm is inserted into the holding hole of the main body, and the supporting arm is fixed to the main body via the at least one conical groove of the supporting arm and the mounting holes of the main body.

2. The manipulator as claimed in claim 1, wherein the main body defines at least one first gas duct and at least one second gas duct in a top surface thereof and a plurality of assembling holes in each of the at least two connecting surfaces, wherein the at least one first gas duct and the at least one second gas duct perpendicularly communicate with the assembling holes, the holding devices are inserted into the a plurality of assembling holes correspondingly, wherein gas injected into or pumped out of the at least one first gas duct and the at least one second gas duct is capable of controlling the holding devices to seize and release grasping members.

3. The manipulator as claimed in claim 1, wherein each of the holding devices comprises a holding member, a thimble, and at least one latching member, wherein the holding member defines at least one receiving hole corresponding to the at least one latching member, wherein the at least one latching member is received in the at least one receiving hole correspondingly, wherein the thimble is capable of abutting and disengaging with the at least one latching member, thereby seizing and discharging the grasping members.

4. The manipulator as claimed in claim 3, wherein each of the holding devices further comprises a cylinder shaft, the cylinder shaft includes a tip portion, wherein the thimble defines a fixing hole, wherein the tip portion of each of the cylinder shafts is fixed in the fixing hole of the thimble, and the cylinder shaft drives the thimble to resist or disengage with the at least one latching member.

5. The manipulator as claimed in claim 3, wherein the main body defines a plurality of assembling holes, wherein each of the holding members of the holding devices includes a threaded portion, and the threaded portions engage in the assembling holes of the main body correspondingly.

6. The manipulator as claimed in claim 3, wherein each of the holding devices further comprises an elastic member and a brake member, wherein the brake member is fixed to the holding member, and two ends of the elastic member resist the brake member and the thimble correspondingly.

7. The manipulator as claimed in claim 3, wherein each of the holding devices further comprises a fixing member, wherein the fixing member is inserted into the holding device and fixed to the thimble.

8. The manipulator as claimed in claim 3, wherein the thimble comprises a resisting portion formed on a bottom, wherein the resisting portion is configured to resist the at least one latching member.

9. A manipulator, comprising:
a main body including at least two connecting surfaces;
a plurality of holding devices configured to seize and release grasping members, each of the holding devices comprising:
a holding member connected to the at least two connecting surfaces of the main body;
at least one latching member capable of recessing into and partially protruding out of the holding member
a thimble capable of resisting and disengaging with the at least one latching member; and
a supporting arm fixed to the main body, and configured to rotate with the main body.

10. The manipulator as claimed in claim 9, wherein the at least one latching member is a ball.

11. The manipulator as claimed in claim 9, wherein the main body is substantially cuboidal, the main body defines a holding hole in a top surface thereof; wherein each of the at least two connecting surfaces of the main body defines a mounting hole; wherein the supporting arm is substantially rod-shaped, and defines at least one conical groove, the supporting arm is inserted into the holding hole of the main body, wherein the supporting arm is fixed to the main body via the at least one conical groove of the supporting arm and the mounting holes of the main body.

12. The manipulator as claimed in claim 11, wherein the main body defines at least one first gas duct and at least one second gas duct in a top surface thereof and a plurality of assembling holes in each of the at least two connecting surfaces, wherein the at least one first gas duct and the at least one second gas duct perpendicularly communicate with the assembling holes, wherein the holding devices are inserted into the a plurality of assembling holes correspondingly, wherein gas injected into or pumped out of the at least one first gas duct and the at least one second gas duct is capable of controlling the holding devices to seize and release grasping members.

\* \* \* \* \*